United States Patent [19]

Bogaerts

[11] Patent Number: 4,726,005
[45] Date of Patent: Feb. 16, 1988

[54] DISC-RECORD PLAYER

[75] Inventor: Johannes L. G. M. Bogaerts, Eindhoven, Netherlands

[73] Assignee: U.S. Philips Corporation, New York, N.Y.

[21] Appl. No.: 768,398

[22] Filed: Aug. 22, 1985

[30] Foreign Application Priority Data

Mar. 4, 1985 [NL] Netherlands .................. 8500594

[51] Int. Cl.⁴ ............................................. G11B 17/04
[52] U.S. Cl. .................................................. 369/752
[58] Field of Search ........................... 369/75.2, 75.1

[56] References Cited

U.S. PATENT DOCUMENTS 4,434,480 2/1984 Fukumitsu ..................... 369/77.2
4,507,771 3/1985 Tanaka ........................... 369/77.2

FOREIGN PATENT DOCUMENTS 43254 3/1985 Japan .............................. 369/75.2

Primary Examiner—Steven L. Stephan
Attorney, Agent, or Firm—F. Brice Faller

[57] ABSTRACT

Disc player has a frame (11) which supports a turntable (13), and a loading mechanism comprising a movable drawer (21) which carries a disc support (29) for transferring the disc to the turntable. The loading mechanism further comprises a vertically movable disc-pressure member for pressing the disc onto the turntable. The frame carries strips (23) and rollers (25) for guiding the drawer movement and an electric drive unit (61) which can be coupled to the drawer by means of at least one friction wheel (65A, 65B) which is supported in the frame and which can be driven by the electric drive unit, and by a drive element (69) on the drawer which is engageable with the friction wheel.

6 Claims, 2 Drawing Figures

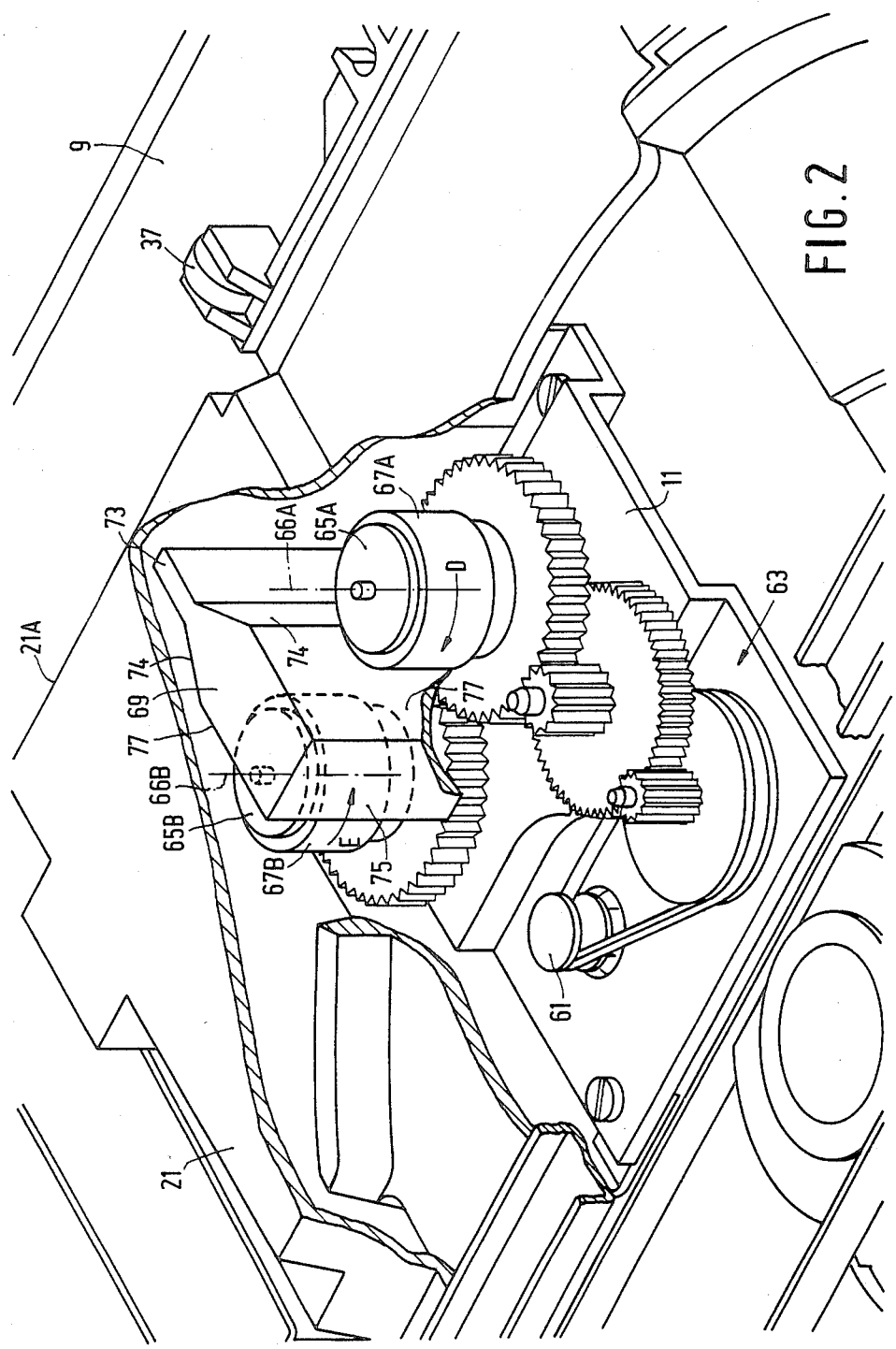

DISC-RECORD PLAYER

BACKGROUND OF THE INVENTION

The invention relates to a disc-record player comprising a disc-loading mechanism, a housing, and a frame supporting a turntable. The loading mechanism comprises a drawer which is movable between an extended position and a retracted position through a front opening in the housing and which carries a transfer means for transferring the disc to the turntable. The frame is provided with a guide means for the drawer movement and with an electric drive unit which can be coupled to the drawer for moving the drawer. The loading mechanism further comprises a vertically movable disc-pressure member for pressing the disc onto the turntable. Netherlands Patent Application No. 8302131 to which U.S. Pat. No. 4,607,361 corresponds, discloses a disc record player for playing optically readable audio discs, which can be adapted to enable optically readable video discs to be played. The underside of the drawer carries two parallel gear racks which mesh with gear wheels supported in the frame and mechanically connected to the electric drive unit. After the actuation of a manual switch the drawer is driven inward or outward by a motor until the drawer butts against a fixed stop which switches off the electric drive unit.

In order to prevent the gear wheel/rack construction or the electric drive unit from being damaged in the event that the drawer is blocked, the known disc-record player must have special provisions, such as a slipping clutch between the gear wheel/gear rack construction and the drive unit. Such a provision also ensures that a person cannot become seriously injured if his fingers get caught between the drawer and the housing.

As the drawer always performs the same translational movement certain teeth of the gear wheel/gear rack construction are always loaded additionally at the end of the inward and the outward movement. In particular when fixed stops are employed, the relevant teeth may be loaded to such an extent that they are subjected to excessive wear, resulting in excessive backlash in the gear wheel/gear rack construction, so that a reliable movement of the drawer is no longer guaranteed.

SUMMARY OF THE INVENTION

It is the object of the present invention to equip a disc-record player with a simple yet safe and reliable coupling between the electric drive unit and the drawer, also enabling the drawer to be mechanically coupled to the eletric drive unit over only a part of its translational movement.

To this end the drawer can be coupled to the electric drive unit by means of at least one frictional wheel which is supported in the frame and which can be driven by the electric drive unit and by means of a drive element of the drawer which is engageable with the friction wheel.

In this way the electric drive unit and the drawer are coupled to each other by means which are inherently capable of slipping. By a suitable choice of the pressure with which the friction wheel acts on the drive element and by a suitable choice of the materials of the cooperating parts of the friction wheel and the drive element, any desired slipping torque can be obtained. Thus, after energization of the electric drive unit the friction wheel will slip on the drive element if a counter force acting on the drawer, for example as a result of blocking of the drawer, exceeds a predetermined value. This construction produces less noise than the known gear wheel/gear rack construction.

The friction wheel can be situated near the rear of the housing, opposite the front opening, the drive element being provided with a contact surface for the friction wheel. Inward movement of the drawer comprises a first stage of movement and a second stage of movement, the drawer being manually movable during the first stage of movement, the contact surface of the drive element contacting the friction wheel at the end of the first stage. The drawer is movable by the friction wheel, which is driven by the electric drive unit and which cooperates with the drive element during the second stage of movement.

This embodiment improves the ease of operation of the disc-record player considerably. Tests have revealed that it is an obvious step for the user to push the drawer backwards after having placed the disc onto the extended drawer. In the disc-record player in accordance with the invention this is utilized in that the first stage of the inward movement is performed by the user, after which the electric drive unit can take over. The use of the friction wheel then ensures a smooth takeover.

A direct consequence of the partly manual inward movement of the drawer is that the energization of the electric drive unit can be initiated by the drawer movement, so that no actuating button for the inward drawer movement has to be provided on the outside of the housing.

The disc-record player in accordance with U.S. Pat. No. 4,607,361 does not allow a partly manual inward movement of the drawer, because the gear wheels are constantly in mesh with the teeth of the gear racks. Moreover, disengaging the gear wheels and the gear racks is not possible in pratice, because problems may arise when the teeth of the cooperating gear wheels and gear racks are brought into mesh again.

It is to be noted that the use of friction wheels in a disc-record player is known per se from German Offenlegungsschrift No. 31 39 336 to which U.S. Pat. No. 4,434,480 corresponds. The record player described therein is a player for playing video discs contained in cassettes. This known disc-record player is not provided with a drawer but comprises U-shaped guide rails for guiding the movement of the cassette into and out of the housing. When the cassette is inserted two edge portions of the cassette are slid between one or two pairs of friction wheels, which move the cassette further into the housing. Inside the housing the cassette is opened, after which the disc is placed onto the turntable and the cassette is automatically moved outwards. An important difference between this known disc-record player and the player in accordance with the invention is the loading mechanism. The known disc-record player comprises a simple loading mechanism for transferring and positioning a comparatively light-weight cassette containing the disc. The type of player to which the present invention relates comprises a loading mechanism with a comparatively heavy drawer and transfer means as well as a disc-pressure member. Therefore, it is surprising that a friction-wheel construction enables both the drawer and the disc-pressure member, whose movement is derived from that of the drawer, to be moved and positioned in an accurately defined manner and to be maintained in their various positions in a stable manner.

A second wheel can be arranged opposite the friction wheel, the drive element having a second contact surface parallel to the contact surface and a free end which points in the direction of inward movement of the drawer to enable the drive element to be inserted tightly between said wheels.

An advantage of this embodiment is that the resultant force exerted on the drawer by the friction wheels in principle acts in the direction of movement of the drawer. Thus, the guide means of the drawer are not subjected to any transverse forces and the supporting means for the drawer can be of a comparatively simple construction.

The free end of the drive element can have bevelled surfaces which diverge toward the contact surfaces. This step ensures a smooth transition from the first stage to the second stage of the inward movement of the drawer.

The disc-record player can have a first switch which can be actuated by the drawer during its first stage of movement to energize the electric drive unit and a second switch which can be actuated by the drawer to switch off the electric drive unit in the fully retracted position of the drawer. Preferably, the disc-record player is provided with a third switch which can be actuated by the drawer to switch off the electric drive unit during the outward movement of the drawer a short time after disengagement of the drawer from the electric drive unit. This has the advantage that the same part of the friction-wheel surface is not constantly in contact with the contact surface of the drive element, so that the friction wheel cannot become flattened at one side. It is to be noted that it is possible to construct the first switch and a third switch as one switch which is actuated both during the inward movement and during the outward movement of the drawer to start and to stop the electric drive unit.

In order to ensure that disturbances in the movement of the drawer do not result in damage to the electric drive unit, the disc-record player can have an electronic timing unit which automatically switches off the electric drive unit, which is in the switched-on condition, after a preset time interval starting at the moment of switching on.

BRIEF DESCRIPTION OF THE DRAWING

FIG. 2 is a perspective view showing a part of the disc-record player of FIG. 1 to a larger scale.

DETAILED DESCRIPTION OF THE PREFERRED EMBODIMENT

Figure 1:
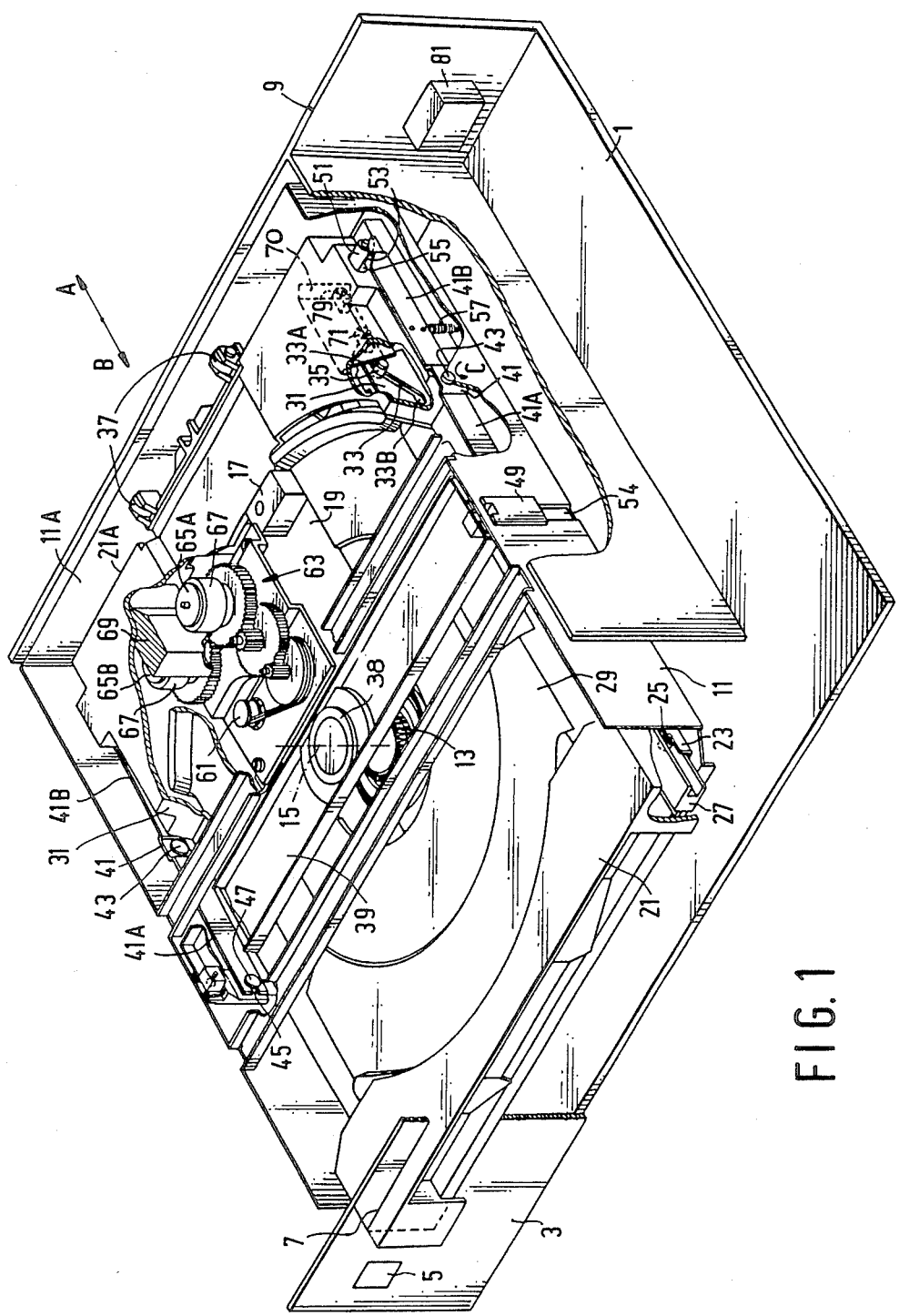
FIG. 1 is a partly cut-away perspective view of a disc-record player in accordance with the invention.

The disc-record player shown in FIGS. 1 and 2 is a video-disc player, which comprises a housing 1 having a front wall 3, an actuating button 5, a front opening 7 and a rear wall 9. The housing 1 accommodates a frame 11 which supports a turntable 13 to which an electric motor is coupled for rotating the turntable about an axis of rotation 15. The frame further supports an optical unit 17, which is movable in a radial direction relative to the turntable 13 for optically reading the information on the optically readable disc as the turntable with said disc is rotated. During reading the optical unit moves in a radial direction through a slot 19 in the frame 11. For the sake of clarity said disc is not shown in the Figures.

A disc loading mechanism includes a drawer 21 which is rectilinearly movable through the front opening 7 in the front wall 3 in an inward direction A and an outward direction B to transfer the disc to and from the turntable. In the position shown in FIG. 1 the drawer 21 is in the almost fully retracted position. The housing 1 carries a guide means for the drawer 21, which means comprises strips 23 carrying a plurality of rollers 25 secured to the frame on each side of the drawer and rails 27 secured to the drawer, the strips 23 and the rails 27 extending parallel to each other and the rollers 25 cooperating with the rails 27.

Transfer means in the form of disc support 29 is situated between two side walls 31 of the drawer 21 and is movable relative to drawer 21 in a vertical direction, i.e. parallel to the axis of rotation 15. For this purpose the side walls 31 are formed with slots 33 near the front and the rear of the drawer 21, which slots are downwardly inclined in the forward direction and the disc support 29 has four pins 35 which are movable in the slots 33. At their ends the inclined slots 33 each adjoin an upper horizontal slot portion 33A and a lower horizontal slot portion 33B. In the extended position and during the greater part of the inward movement and the outward movement of the drawer the pins 35 are situated in the slot portion 33A, as is shown in FIG. 1. On the side facing the rear wall 9 the disc support 29 carries two runner wheels 37, which run against the rear wall 9 briefly before the drawer 21 reaches the fully retracted position. This precludes a further movement of the transfer means 29 in the inward direction of the drawer 21 and ensures that as the movement of the drawer 21 continues the pins 35 are guided in the slots 33, causing the disc support 29 to perform a vertically downward movement and the runner wheels 37 to run over the rear wall 9. The above arrangement of the disc support in the drawer is such that vertical movement of the disc support 29 is performed after the disc has reached a coaxial position above the turntable 13. When the drawer is in the fully retracted position the pins 35 are situated in the slot portions 33B and the support has reached its lowest level. The disc is then situated on the turntable 13 and is clear of the disc support 29. For a more detailed description of the construction and the movements of the transfer means reference is made to Netherlands Patent Application No. 8302129, to which allowed U.S. patent application Ser. No. 617,067 corresponds.

The loading mechanism further includes a disc-pressure member 38 carried by a pressure-member support 39 which is movable between a position in which it is situated at a specific distance from the turntable 13 and an operating position in which the disc-pressure member 38 exerts pressure on the disc (FIG. 1 shows an intermediate position). The movement of the pressure-member support 39 out of and towards the operative position is derived from the rectilinear movement of the drawer 21. For this purpose the frame 11 carries two levers 41 on opposite sides of the drawer 31. The two levers 41 each comprise a first lever arm 41A and a second lever arm 41B and they are each pivotable about a pivotal axis 43. The first lever arms 41A each have an open ended hole 45 which is engageable by a pin 74 connected to the pressure-member support 39. In order to enable the disc-pressure member 38 to be moved parallel to the axis of rotation 15 of the turntable 13 a sliding block 49 which is vertically movable in an opening 54 in the frame 11 is secured to opposite sides of the pressure-member support 39.

The second lever arms 41B of the levers 41 each carry a rotatable roller 51 which is cooperable with an inclined wall portion 53 of a groove 55 in the side walls 31 of the drawer 21. Towards the end of the inward movement of the drawer 21 the rollers 51 run over the wall portions 53 and the levers 51 are pivoted about the pivotal axis 43 in the direction indicated by the arrow C in FIG. 1. By means of the open pin-hole linkages 45, 47 this pivotal movement is converted into a vertical downward movement of the sliding blocks 49 and hence of the pressure-member support 39 and the pressure member 38. At least the central portions of the grooves 55 and the inclined wall portions 53 are downwardly inclined, viewed in the inward direction of movement of the drawer.

Between the frame 11 and the levers 41 helical springs 57 may be arranged to keep the levers in a neutral position when the drawer is in the extended or partly extended position, so that the rollers 51 are situated at the correct level relative to the grooves 55 when the drawer 21 is slid in.

In order to obtain some of the movements of the drawer 21 the player comprises an electric motor, whose pulley 61 is visible in FIG. 1. Two friction wheels 65A and 65B, which are journalled in the frame 11, can be rotated about axes of rotation 66A and 66B respectively by means of a gear-and-belt transmission 63.

The friction wheels 65A and 65B, which have friction surfaces 67A and 67B respectively are situated close to the rear wall 9 and are spaced from each other. A suitable friction surface is silicone rubber, which has a high resistance to wear and a high coefficient of friction. Near its rear wall 21A the drawer 21 carries a drive element 69 cooperates with the two friction wheels 65A and 65B.

The inward movement of the drawer 21 is divided into a first stage of movement and a second stage of movement. During the first stage of movement the drawer is manually slid inwards from the extended position. The transition to the second stage is effected when during the inward movement an actuating surface 70 on the drawer actuates a first switch 71 which is secured to the frame 11, thereby starting the electric motor 61. The dimensioning is such that at the instant at which the switch 71 is actuated the drive element 69 of the drawer 21 is already in contact with the friction surfaces 67A and 67B of the friction wheels 65A and 65B. The energized electric motor 61 causes the friction wheels 65A and 65B to rotate in the directions indicated in FIG. 2 by the arrows D and E via the said transmission 63, so that the drive element 69 is drawn into and through the gap between the two friction wheels 65A and 65B, which results in a movement of the drawer 21, referred to as the second stage of movement, produced by the electric motor 61.

In order to ensure a smooth transition between the first and the second stage of movement, the drive element 69 is formed with bevelled surfaces 74 between a narrow end portion 73, which can readily be slid between the friction wheels, and a wider main portion 75. The sides of portion 75 are provided with contact surfaces 77 of glass-filled polyphenylene oxide for cooperating with the friction surfaces 67A and 67B of the friction wheels 65A and 65B respectively. The width of main portion 75 of the drive element 69 in relation to the gap between the friction wheels 65A and 65B and the materials at the location of the contact surfaces 77 and the friction surfaces 67A and 67B determine the slipping torque.

The second stage of the inward movement of the drawer 21 is terminated when the drawer 21 actuates a second switch 79 secured to the frame 11, thereby switching off the electric motor 61. The second switch 79 is arranged so that the drawer 21 is in the fully retracted position when the electric motor 61 stops. The switched off motor 61 and the transmission 63 ensure that the drawer is retained in the retracted position by the forces exerted on the drive element 69 by the friction wheels 65A and 65B.

By actuating the button 5 on the front wall of the housing 1 the electric motor 61 can be restarted with such a direction of rotation that the driven friction wheels 65A and 65B rotate in directions opposite to those indicated by the arrows D and E respectively. The drawer 21 is then moved outwards until the drive element 69 is no longer in contact with the friction wheels 65A and 65B. The outward movement may then be completed manually. The electric motor 61 is switched off automatically after the outwardly moving drawer 21 has actuated the first switch 71. Between the switch 71 and the electric motor 61 an electric circuit may be arranged which ensures that the motor 21 is not switched off until a specific time interval after actuation of the switch 71 has elapsed. The friction wheels 65A and 65B which are no longer in contact with the drive element 69 are then stopped in arbitrary positions. This ensures that the friction wheels do not become flattened at one side after prolonged use.

An electronic timing unit 81 which ensures that the electric motor 61 cannot remain energized longer than a predetermined maximum time interval after switching on, the power supply to the motor 61 being interrupted automatically after this interval. This ensures that possible minor mechanical faults, for example a defective switch, cannot cause serious damage to the disc-record player.

What is claimed is:
1. A disc-record player comprising:
a housing having a front opening therein,
a drawer movable through said front opening between an extended position and a retracted position, inward movement of said drawer comprising a first stage of movement and a second stage of movement, said drawer being movable manually during said first stage, said drawer having thereon an elongate drive element having a pair of opposed contact surfaces which substantially parallel the direction of movement of said drawer,
a frame fixed in said housing, said frame having guide means thereon for guiding said drawer on a rectilinear horizontal path,
a turntable supported by said frame,
a disc support carried by said drawer for transferring said disc to said turntable,
a disc pressure member movable vertically to press the disc onto the turntable,
an electric drive unit which can be coupled to the drawer for moving the drawer,
first and second friction wheels supported by said frame and which can be driven by said electric drive unit, said friction wheels being situated near the rear of the housing opposite the front opening, said drive element being received between said friction wheels so that said wheels engage respective opposed contact surfaces at the end of the first stage of movement, said drive unit driving said friction wheels to move said drawer during said second stage of movement.

2. A disc-record player as claimed in claim 1, characterized in that the disc-record player comprises a first switch which can be actuated by the drawer during its first stage of movement to energize the electric drive unit and a second switch which can be actuated by the drawer to switch off the electric drive unit in the fully retracted position of the drawer.

3. A disc-record player as claimed in claim 1, characterized in that the disc-record player is provided with a third switch which can be actuated by the drawer to switch off the electric drive unit during the outward movement of the drawer a short timer after disengagement of the drawer from the electric drive unit.

4. A disc-record player as claimed in claim 1, characterized in that the disc-record player comprises an electronic timing unit which automatically switches off the electric drive unit, which is in the switched-on condition, after a preset time interval starting at the moment of switching off.

5. A disc-record player as in claim 12 wherein said disc support moves horizontally during said first stage of movement and vertically during said second stage of movement.

6. A disc-record player as in claim 1 wherein the drive element has a narrow end which points in the direction of inward movement of the drawer and a pair of bevelled surfaces which diverge from the narrow end toward the contact surfaces.

* * * * *